US008382164B2

(12) United States Patent
Gibb et al.

(10) Patent No.: US 8,382,164 B2
(45) Date of Patent: Feb. 26, 2013

(54) APPARATUS AND A METHOD OF INSERTING A SERIES OF CONTENTS INTO A SERIES OF CONTAINERS

(75) Inventors: Ian Gibb, Cheshire (GB); Allan Harle, Cheshire (GB)

(73) Assignee: Inspectron Holdings Limited

( * ) Notice: Subject to any disclaimer, the term of this patent is extended or adjusted under 35 U.S.C. 154(b) by 329 days.

(21) Appl. No.: 11/994,008

(22) PCT Filed: Jun. 28, 2006

(86) PCT No.: PCT/GB2006/002388
§ 371 (c)(1), (2), (4) Date: Aug. 19, 2008

(87) PCT Pub. No.: WO2007/000600
PCT Pub. Date: Jan. 4, 2007

(65) Prior Publication Data

US 2008/0296312 A1 Dec. 4, 2008

(30) Foreign Application Priority Data

Jun. 29, 2005 (GB) .................................. 0513251.9

(51) Int. Cl.
*B42D 15/00* (2006.01)
*G09C 3/00* (2006.01)

(52) U.S. Cl. ................ 283/67; 283/72; 283/79; 283/81; 283/85; 283/116; 283/901

(58) Field of Classification Search .................... 53/411, 53/473; 101/71; 283/53, 56, 57, 58, 59, 283/67, 71, 72, 73, 79, 80, 81, 85, 87, 88, 283/99, 100, 101, 103, 104, 105, 106, 115, 283/116, 901, 903; 355/201; 358/453, 462, 358/464, 526, 538; 382/112, 162, 207, 291, 382/312; 493/186, 187, 188, 216, 249, 419, 493/420, 421, 917, 919; 705/50, 75, 76, 705/401, 408; *B42D 15/00; B65B 1/04, B65B 3/04; G06F 17/60; G06K 9/00; G09F 1/00*
See application file for complete search history.

(56) References Cited

U.S. PATENT DOCUMENTS

| | | | | |
|---|---|---|---|---|
| 5,544,921 | A | 8/1996 | Cynan et al. | |
| 5,602,939 | A * | 2/1997 | Hashiguchi et al. | 382/162 |
| 5,921,065 | A * | 7/1999 | Slyster et al. | 53/473 |
| 6,505,179 | B1 * | 1/2003 | Kara | 705/50 |
| 2003/0218329 | A1 * | 11/2003 | Buck | 283/56 |

(Continued)

*Primary Examiner* — Dana Ross
*Assistant Examiner* — Justin V Lewis
(74) *Attorney, Agent, or Firm* — Nelson Mullins Riley & Scarborough LLP

(57) ABSTRACT

In apparatus for and a method of inserting a series of contents (1) into a series of containers (3), identifying magnetic indicia are printed on each one of the series of contents before insertion in the containers. After insertion and sealing of the containers the contents cannot be visually inspected without breaking the seals. The indicia are magnetically read by a reader (7) through the material of the sealed containers (3) and visible indicia corresponding to the identifying magnetic indicator retrieved from store (6), and applied to the exterior of the containers by a printer (5). The apparatus and method are applicable to automatic mailing systems where it is necessary to ensure that the correct addresses corresponding to a previously inserted series of letters in a series of respective envelopes are printed later on the exteriors of the envelopes. Instead of magnetically based systems, infra-red radio isotope or radio frequency identification based systems may also be used.

32 Claims, 3 Drawing Sheets

U.S. PATENT DOCUMENTS

2004/0174013 A1* 9/2004 Dyer .............................. 283/116
2005/0225076 A1* 10/2005 McCreary et al. .............. 283/56
2006/0202468 A1* 9/2006 Phillips et al. .................. 283/72

* cited by examiner

APPARATUS AND A METHOD OF INSERTING A SERIES OF CONTENTS INTO A SERIES OF CONTAINERS

TECHNICAL FIELD

The present invention relates to apparatus for automatically inserting a series of contents into a series of respective containers. The contents may be documentary and the containers may be envelopes.

BACKGROUND OF THE INVENTION

Traditionally, important and customer unique mailpieces, such as bank statements, credit card statements, phone bills etc., are printed on high speed laser or inkjet printers. A typical print run may contain 20,000 customer statements. After printing, the statements are collated, should there be more than one page per statement, folded and inserted at high speed into an envelope for delivery to the postal service.

Because of the speed and complexity of statement production, there is always the possibility of paper jams, operator error, such that a page may be inserted in the incorrect envelope by mistake. A high degree of quality control during production is therefore necessary to avoid such mistakes, which could have the adverse marketing effect of seriously questioning the issuing bank's security procedures.

Normally, the customer name and address is printed on the first statement page, such that, when folded, it is still visible. A window envelope is used to carry the statement, with the customer address so positioned that it is visible through this window, and can thus be delivered by the postal service.

There are two main disadvantages to this method.

1. Window envelopes are more expensive to produce than normal, closed face envelopes.
2. Marketing professionals would prefer a closed face envelope, to give the impression of a more "valuable" personalised communication, not just yet another bill.

Use of a window envelope has the benefit of higher security, but the above two disadvantages.

A closed face envelope can be used, but it is then necessary to print the customer name and address on the outside of this envelope. If the contents are non-unique, for example a general marketing message, then a database of target customers can feed an inkjet printer with controls to print each address, and it is not material if the addresses get out of sequence due to machine or operator malfunction, because all contents are identical.

In the case of personalised contents, like bank statements, a possible solution lies in using a camera to read a printed code on the statement just before it is inserted into the envelope, and remember that code. Once the completed envelope has reached the end of the insertion machine (which could be three meters and two seconds in time later, during which other envelopes are passing through their own part of the cycle), the remembered code is fed to the closed face inkjet printer for addressing that particular customer mailpiece.

Disadvantages with this solution are:

1. The insertion machine may jam or get out of step during that critical three meters delay.
2. The operator has no way to verify that the correct contents match the outside address, unless he opens and destroys samples during production.

SUMMARY OF THE INVENTION

According to one aspect of the present invention, there is provided apparatus for automatically inserting a series of contents into a series of respective containers including means for sequentially feeding the series of containers to an insertion station, means for sequentially feeding the series of contents to the insertion station, each one of the series of contents bearing identifying indicia, means for sequentially inserting respective ones of the series of contents into corresponding ones of the series of containers such that the material of each container visually obscures the indicia on the corresponding contents, means for reading indicia through the material of the corresponding container and means for applying visible indicia to the exterior of each container corresponding to the obscured indicia on the corresponding contents.

According to another aspect of the present invention, there is provided a method of automatically inserting a series of contents into a series of respective containers including the steps of feeding sequentially the series of containers to an insertion station, feeding, sequentially the series of contents to the insertion station, each one of the series of contents bearing identifying indicia, inserting respective ones of the series of contents into corresponding ones of the series of containers such that the material of each container obscures the indicia on the corresponding contents, reading the indicia on each contents through the material of the corresponding container and applying visible indicia to the exterior of each container corresponding to the obscured indicia on the corresponding contents.

According to a further aspect of the present invention, there is provided a sealed container, and contents within the container, wherein the contents have identifying indicia applied thereto which are not visible externally of the container but which are readable externally of the container and the container bears information applied to the external surface thereof which corresponds to the identifying indicia on the contents.

In a preferred embodiment of the invention, identifying indicia and the means for reading are magnetic. Alternatively, the indicia and means for reading may be heat based (infra red), light sensitive based, radio isotope based or based upon radio frequency identification technology (RFID). On reading the indicia through the material of the container data is retrieved from a database corresponding to the indicia and applied to the external surface of the corresponding container. The means for applying visible indicia could be a laser printer or any inkjet printer.

A second means for reading may be disposed to read the identifying indicia again and means provided to compare those indicia with the visible indicia applied to the external surface.

DESCRIPTION OF THE DRAWINGS

In order that the invention may be more clearly understood, embodiments of the invention will now be described by way of example with reference to the accompanying drawings, in which.

DETAILED DESCRIPTION

Figure 1:
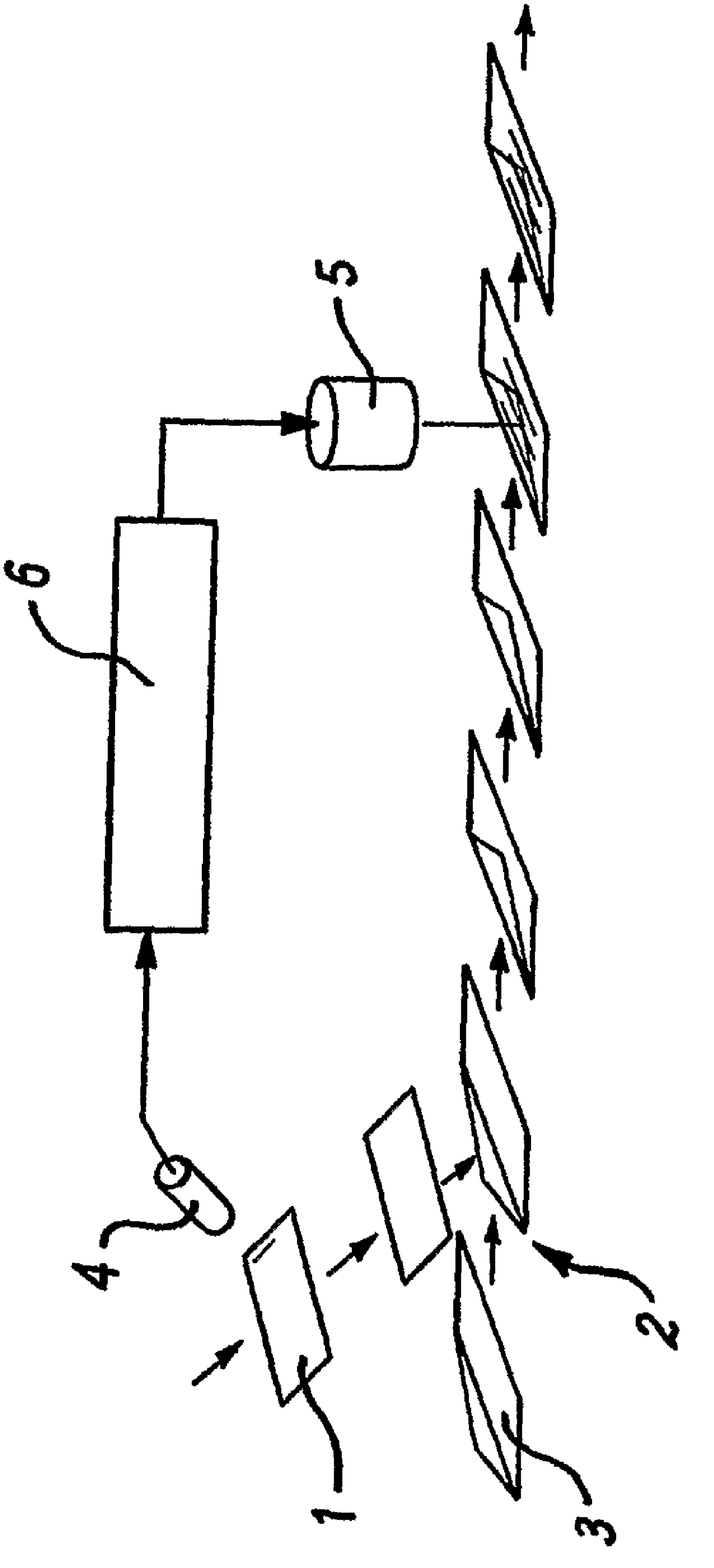
FIG. 1 diagrammatically shows an existing automated mailing system.

Referring to FIG. 1, the existing automatic mailing system comprises means for sequentially feeding a series of contents in the form of documents (1) towards an insertion station identified generally by the reference numeral (2) and means for sequentially feeding a series of containers in the form of envelopes (3) towards the insertion station (2). Indicia in the form of an optical code is printed on each document so that it can be identified. The code may be an Optical Mark, a barcode, or an Optical Character. A reader (4) is used to read the code that has been printed on the document (1) before it is inserted into the envelope (3). Due to the design of the document inserters at the insertion station (2) optical code is read from each document (1) several steps before the document is inserted into the envelope (3).

After the document is inserted into the envelope it passes under a printer (5) which would normally be an inkjet printer (IJP). The data for the printer is provided from a database (6). The correct address is extracted from the database (6) using the code read from the document (1) by the reader (4). As the filled envelope is stepped through the inserter and then under the IJP, the relevant data is sent to the IJP so that the correct address can be printed on the envelope.

In this system once the envelope is closed there is no non-destructive way of checking its contents. If synchronisation of the sequence of inserts, or envelopes, is lost after the reader (4) has read the code, there is a risk that the correct address will not be printed on the envelope. This is because the code is read several stages before the envelope passes under the inkjet printer. Such mismatching can have potentially disastrous results.

At the insertion station (2) the documents (1) are inserted into respective envelopes (3) sequentially. As the envelopes are non-window envelopes, the material of the envelopes (3) obscures the optical code printed on the documents (1).

Figure 2:
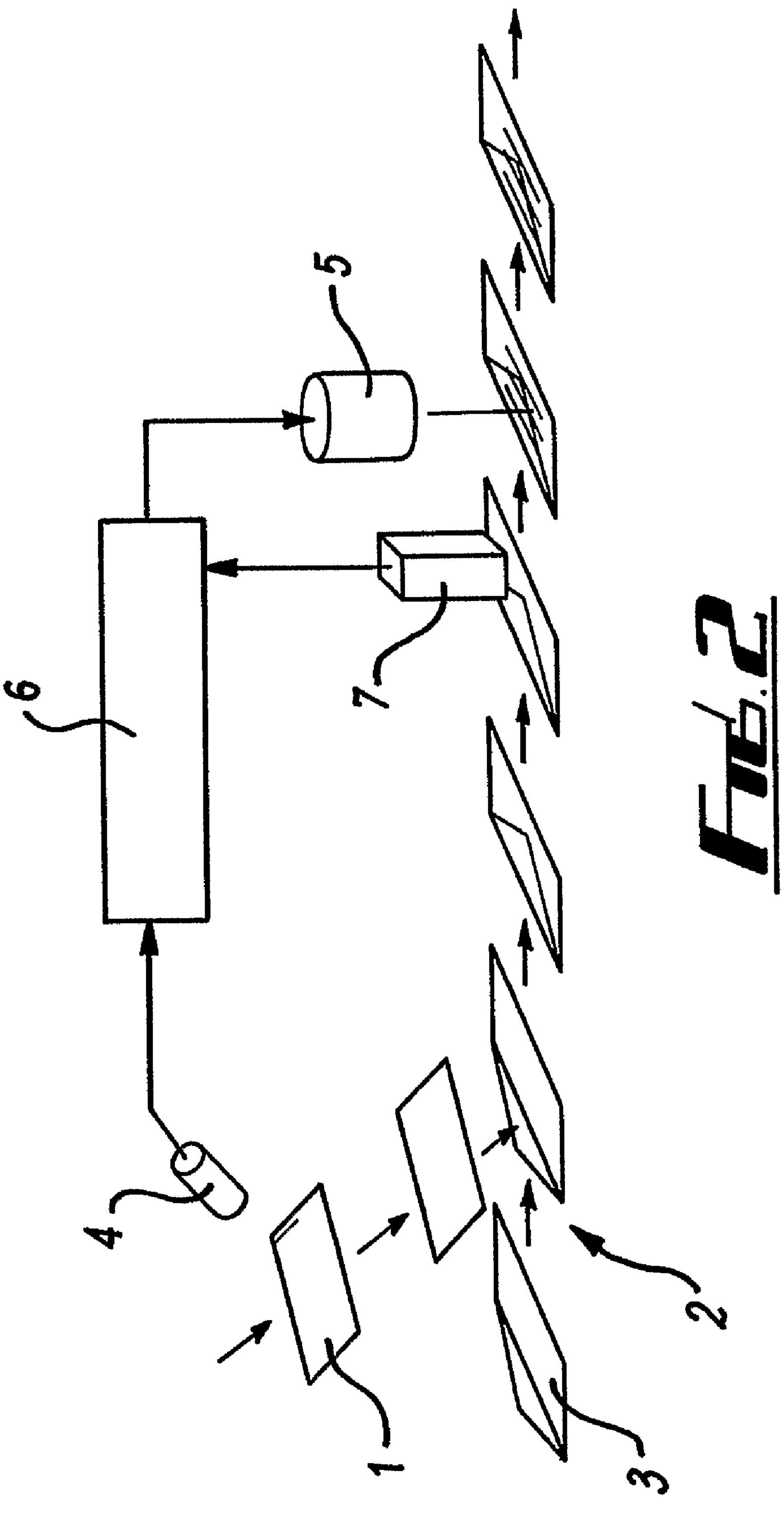
FIG. 2 diagrammatically shows an automated mailing system according to the present invention.
Figure 3:
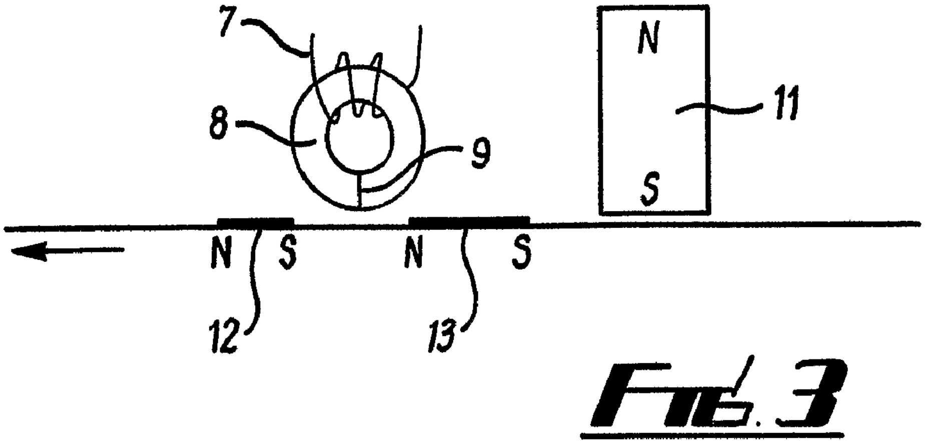
FIG. 3 is a more detailed view of the reader forming part of the system of FIG. 2, and FIG. 4 graphically shows exemplary signals generated by the reader of FIG. 3.

A system according to the invention will now be described with reference to FIGS. 2, 3 and 4 of the drawings. Equivalent parts of the two systems bear the same reference numerals. The system of the invention comprises means for sequentially feeding a series of contents in the form of documents (1) towards an insertion station identified generally by the reference numeral (2) and means for sequentially feeding a series of containers in the form of non-windowed envelopes (3) to the insertion station (2). The documents (1) are inserted into corresponding envelopes (3) at the insertion station (2) and the envelopes sealed. From that point on the contents cannot be visually inspected without breaking the seal on the corresponding envelope (thus destroying the envelope) and removing the related contents. Prior to insertion into the envelopes (2) each document (1) is printed with a code (which may typically be a barcode) identifying the document which can be read not only visually but also magnetically. For this purpose the ink or toner used for printing the code is loaded with magnetic content.

Until each document is put into its envelope the code can be read optically using conventional readers, as described in relation to the system of FIG. 1.

Each document is folded such that the code is on an outside face when the document is inserted in the envelope. Once the envelope is filled and sealed, the envelope passes through a magnetic code reader (7) that is placed immediately before the IJP (5). The magnetic code reader detects and reads the code that has been printed on the document through the material of the envelope. The database (6) uses this code to select the correct address for the IJP (5). The IJP then prints the address in the normal way.

In this way the contents of each envelope can be verified immediately before the address is printed and therefore guarantees that there is no loss of synchronisation and hence no loss of integrity of the system.

The barcode printed on the document would typically be a standard numeric barcode, such as interleaved 2 of 5. The magnetic barcode must be magnetised before a read head can detect it. Passing the code under a permanent magnet 11 effects the magnetisation. This arrangement is shown in FIG. 3.

The read head of the magnetic code reader (7) consists of a laminated iron core (8) with a small gap (9). The code must pass in close proximity to the gap (9) and the magnetised strokes of the barcode are detected by the fringing magnetic fields that are created across the gap (9) in the core (8). As the strokes of the barcode pass the read head an electric current is induced in a coil (10) wound around the core (8) of the read head. Parts of the magnetised barcode are indicated at 12 and 13 on FIG. 3.

Figure 4:
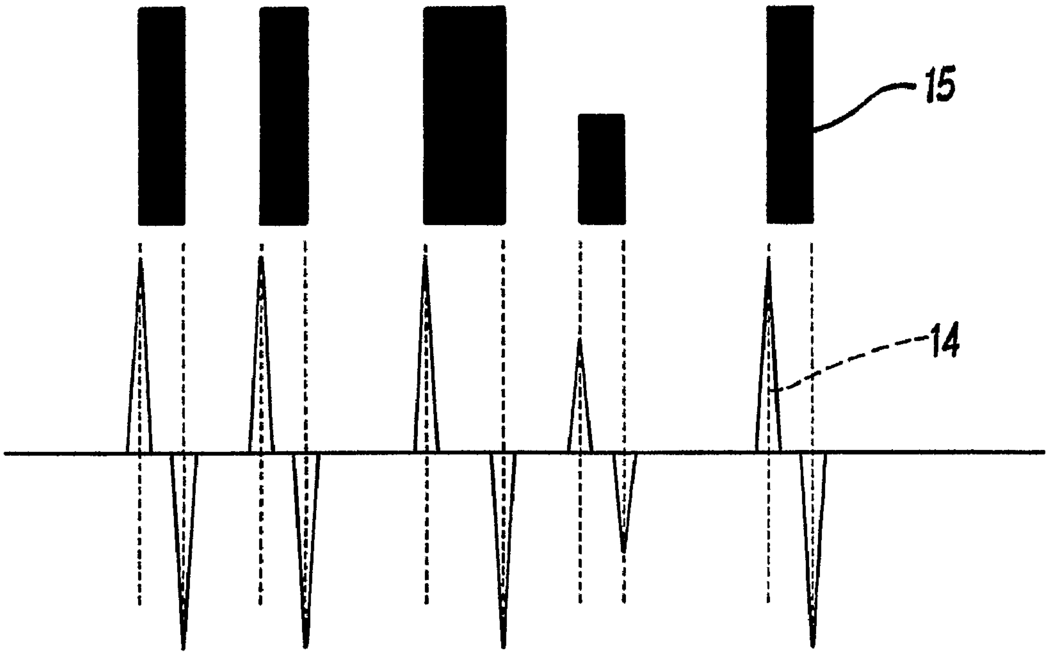

An example of the signals generated by the read head is shown in FIG. 4.

The horizontal spacing of the signals is proportional to the pitch of the bars of the code. The vertical amplitude (14) of the signal is proportional to the speed of the envelope and the height (15) of the bars.

The signals are amplified and filtered, and then passed through a detection and decoding algorithm to output the code represented by the bars.

The code is passed to the database system to extract the correct address for the envelope. The envelope is printed with the correct address at a printing station indicated generally on FIG. 2 by reference numeral 16.

Additional verification could be added immediately after the address has been printed to confirm that it has been printed correctly.

The contents of the envelope can be verified immediately prior to address printing. The integrity of the system does not rely on correct sequence to be maintained in the inserter. So that, in the event of an envelope misfeed or other inserter error, there will be no loss of integrity.

Most laser toner and other printer media contain magnetic particles and so there is usually no additional process required for printing the magnetic barcode.

The contents of the envelope can be verified at any time using stand-alone magnetic readers.

Standard barcode can be used so that no special fonts are required during the printing process.

Standard barcode readers can be used to read the barcode optically prior to inserting the document in the envelope.

It will be appreciated that the above embodiment has been described by way of example only and that many variations are possible without departing from the scope of the invention. For example, although the non-visual reading system described is magnetic (which enables advantage to be taken of the magnetic properties of printer inks), other non-visual reading systems may be employed. These may be based on heat (infra-red) or other light sensitive inks or radio isotope doped inks, and RFID (radio frequency identification technology) actually printed onto the page. In addition, for extra security, a second reader could be employed to read the contents just after printing, and compare the result with an optical or camera read of the address, without stopping production or damaging the envelope.

Further, although the specific example described concerns documents and envelopes, the invention has general application in the packaging field. Thus the invention may be applied to pharmaceutical packaging (wrong contents and outside box could be very dangerous) and distribution channel monitoring (some high value perfumes are exclusively distributed. Batch codes can help track rogue dealers and genuine contents).

The invention claimed is:

1. An apparatus for automatically inserting a series of contents into a series of respective containers, the apparatus including:

means for sequentially feeding the series of containers to an insertion station, means for sequentially feeding the series of contents to the insertion station, each one of the series of contents bearing identifying indicia, means for sequentially inserting respective ones of the series of contents into corresponding ones of the series of containers such that a material of each container visually obscures the identifying indicia on the corresponding contents so that the identifying indicia are not visible externally of the container, means for reading the visually obscured identifying indicia on each content through the material of the corresponding container while the identifying indicia are not visible externally of the corresponding container, means for deriving visible indicia from the visually obscured identifying indicia read through the material of the corresponding container, and means for applying the derived visible indicia to the exterior of the corresponding container.

2. The apparatus as claimed in claim 1, in which the means for reading are magnetic.

3. The apparatus as claimed in claim 1, in which the means for reading are heat based.

4. The apparatus as claimed in claim 3, in which the means for reading is infra-red.

5. The apparatus as claimed in claim 1, in which the means for reading is light sensitive based.

6. The apparatus as claimed in claim 1, in which the means for reading is radio isotope based.

7. The apparatus as claimed in claim 1, in which the means for reading is radio frequency identification technology (RFID).

8. The apparatus as claimed in claim 1, in which the means for applying visible indicia comprises a laser printer.

9. The apparatus as claimed in claim 1, in which the means for applying visible indicia comprises an inkjet printer.

10. The apparatus as claimed in claim 1, in which means are provided for printing indicia on the series of contents.

11. The apparatus as claimed in claim 10, in which the means for printing indicia are operative to print in ink or toner loaded with magnetic content.

12. The apparatus as claimed in claim 10, in which the means for printing indicia is operative to print indicia in the form of a barcode.

13. The apparatus as claimed in claim 12, in which the means for reading comprises a magnetic barcode reader.

14. The apparatus as claimed in claim 13, in which the signals generated in the reader are amplified and filtered and passed through a detection and decoding algorithm to output the code represented by the bars of the barcode.

15. The apparatus as claimed in claim 1, in which further means are provided to read the visually obscured identifying indicia on the contents after application of visible indicia and to compare the result with an optical read of the visible indicia.

16. A method of automatically inserting a series of contents into a series of respective containers, the method comprising:

feeding sequentially the series of containers to an insertion station, feeding sequentially the series of contents to the insertion station, each one of the series of contents bearing identifying indicia, inserting respective ones of the series of contents into corresponding ones of the series of containers such that a material of each container obscures the identifying indicia on the corresponding contents so that the identifying indicia are t visible externally of the container, reading the visually obscured identifying indicia on each content through the material of the corresponding container while the obscured identifying indicia are not visible externally of the corresponding container, deriving visible indicia from the visually obscured identifying indicia read through the material of the corresponding container, and applying the derived visible indicia to the exterior of the corresponding container.

17. The method as claimed in claim 16, in which the indicia are read magnetically.

18. The method as claimed in claim 16, in which the indicia are read by infra-red.

19. The method as claimed in claim 16, in which the indicia are read by light sensitive means.

20. The method as claimed in claim 16, in which the indicia are printed with radio isotope based inks and read by means responsive to those inks.

21. The method as claimed in claim 16, in which the indicia are printed and read using radio frequency identification technology (RFID).

22. The method as claimed in claim 16, in which after applying visible indicia to the exterior of each container, the indicia on the contents of that container are read and compared with those visible indicia read optically.

23. The method as claimed in claim 16, in which the visible indicia are printed by means of a laser printer.

24. The method as claimed in claim 16, in which the visible indicia are printed by means of an inkjet printer.

25. The method as claimed in claim 16, in which the indicia on the series of contents are printed with ink or toner loaded with magnetic content.

26. The method as claimed in any one of claim 16, in which the indicia is printed as a barcode.

27. The method as claimed in claim 26, in which when the barcode is read, signals are generated which are amplified, filtered and passed through a detection and decoding algorithm to output the code represented by the bars of the barcode.

28. A sealed container, and contents within the container, wherein the contents have visually obscured identifying indicia applied thereto which are not visible externally of the container but which are readable externally of the container and the container bears information applied to the external surface thereof that is derived from the visually obscured identifying indicia which are readable externally.

29. The sealed container as claimed in claim 28, in which the visually obscured identifying indicia are magnetically readable.

30. The sealed container as claimed in claim 28, in which the visually obscured identifying indicia are infra-red readable.

31. The sealed container as claimed in claim 28, in which the visually obscured identifying indicia are printed with radio isotope based inks.

32. The sealed container as claimed in claim 28, in which the visually obscured identifying indicia are printed using radio frequency identification technology.

* * * * *